United States Patent [19]

Watanabe

[11] Patent Number: 5,056,002
[45] Date of Patent: Oct. 8, 1991

[54] CACHE MEMORY FOR USE WITH MULTIPROCESSOR SYSTEMS

[75] Inventor: Takayuki Watanabe, Tokyo, Japan

[73] Assignee: NEC Corporation, Tokyo, Japan

[21] Appl. No.: 153,890

[22] Filed: Feb. 9, 1988

[30] Foreign Application Priority Data

Feb. 9, 1987 [JP] Japan .............................. 62-29293

[51] Int. Cl.$^5$ ...................... G06F 15/16; G06F 13/00
[52] U.S. Cl. ................................. 364/200; 364/228.7; 364/243.41; 364/243.44
[58] Field of Search ... 364/200 MS File, 900 MS File

[56] References Cited

U.S. PATENT DOCUMENTS

| | | | |
|---|---|---|---|
| 4,228,503 | 10/1980 | Waite et al. | 364/200 |
| 4,349,871 | 10/1982 | Lary | 364/200 |
| 4,442,487 | 4/1984 | Fletcher et al. | 364/200 |
| 4,503,497 | 3/1985 | Krygowski et al. | 364/200 |
| 4,768,148 | 8/1988 | Keeley et al. | 364/200 |
| 4,794,524 | 12/1988 | Carberry et al. | 364/200 |
| 4,847,804 | 7/1989 | Shaffer et al. | 364/900 |

Primary Examiner—Gareth D. Shaw
Assistant Examiner—J. Loomis
Attorney, Agent, or Firm—Sughrue, Mion, Zinn Macpeak & Seas

[57] ABSTRACT

In order to increase a multiprocessing speed, a cache memory is provided with a dual ported storage section so as to be independently accessible by a processor allocated to the cache memory and by another cache memory. The dual ported storage section saves tag addresses and valid tag address information. Each of the tag addresses corresponds to data stored in a data storage section which forms part of the cache. One of two comparators coupled to the dual ported storage section checks to see if an address updated by another cache is in the cache. When this happens, the valid tag address information of the address is invalidated.

2 Claims, 3 Drawing Sheets

CACHE MEMORY FOR USE WITH MULTIPROCESSOR SYSTEMS

BACKGROUND OF THE INVENTION

1. Field of the Invention

This invention relates generally to a cache memory and more specifically to such a memory which is highly suited for use with multiprocessor systems.

2. Description of the Prior Art

In order to improve effective memory transfer rates and, accordingly, raise processing speeds, it is a known practice to provide a high speed cache memory between a processor and a low speed main memory. The cache memory works by saving a duplicate copy of the most recently used data. When the processor asks for data, a cache control circuit (viz., a tag address comparator) checks to see if the data is in the cache memory. If it is, the processor gets it quickly because the cache memory is very fast. Otherwise, the data is derived from the slower (but larger) main memory. When that happens, the cache memory copies the data derived from the main memory so that it will be available quickly the next time.

This procedure is effective because most computer programs have "locality", that is, they tend to work with a small group of items for a long time, whereby a high hit rate can be achieved.

Detecting a cache hit or a cache miss is described briefly hereinbelow and will be discussed later in more detail with reference to FIG. 1. A tag address storage section, which forms part of a cache memory, outputs a plurality of tag addresses in response to a set address involved in an access address signal applied from the processor. Following this, the tag address comparator compares the tag address from the tag address storage section with a tag address involved in the access address signal from the processor, and generates a signal indicating a cache hit or a cache miss.

When cache memories are applied to a multiprocessor system, a cache memory is arranged between each processor and the main memory. However, application of known cache memories to such a multiprocessor system has encountered the problems that the system may cause erroneous operations or the operation of a processor is forced to a stop temporarily. These problems arise from the fact that each of the conventional cache memories is provided with only a single tag address comparator. Before describing this invention in detail, the problems of the prior art will further be discussed with reference to FIG. 1.

FIG. 1 is a block diagram showing a known cache memory unit of the type to which this invention is applicable. When such a cache memory is applied to a multiprocessor, a plurality of caches are prepared and each is arranged between each of a plurality of processors (CPUs) and a system bus to which a main memory is coupled.

The FIG. 1 arrangement generally comprises a data storage section 9, a tag address storage section 6, a valid tag address information storage section 7, and a least recently used (LRU) WAY information storage section 4, wherein the term "WAY" indicates one of divided small storage regions of a memory. Each of the storage sections 6, 7 and 9 consists of a plurality of WAYs (four WAYs, for example, but only two WAYs are shown in the Figure). Each WAY of the data storage section 9 is divided into four blocks 1 through 4 and stores data for quick reference by a processor (not shown), while each WAY of the tag address storage section 6 stores tag addresses of the data saved in the corresponding WAY of the data storage section 9. On the other hand, each WAY of the valid tag address information storage section 7 stores tag address information as to whether or not each of the tag addresses in the corresponding WAY of the section 6 is valid, while the LRU WAY information storage section 4 stores information as to which WAY should be updated by the data derived from a main memory (not shown) via a system bus in the event of a cache miss.

As illustrated in FIG. 1, an input/output (I/O) data buffer 1 is provided for temporarily holding data that will be subsequently delivered to the processor, the data storage section 9, or the main memory. An access address buffer 2 is coupled to receive an access address signal from the processor, and is divided into three buffer sections 2a, 2b and 2c which are assigned to temporarily hold tag, set and block addresses, respectively. A controller 3, comprised of complex logic circuitry, is coupled to a control terminal of the processor. The controller 3 will not be disclosed in detail for brevity.

The set address is applied, from the set address buffer 2b, to each WAY of the storage sections 6 and 7, and causes the storage sections 6 and 7 to respectively output the corresponding tag address and the corresponding tag address information therefrom, which are sent to a tag address comparator 5. The comparator 5 checks to see if the tag address from the buffer 2a coincides with any of the tag addresses from the tag address storage section 6, and also checks to see if a matched tag address (if any) is valid.

In the event that the tag address from the buffer 2a is equal to one of the tag addresses from the storage section 6 while the matched tag address proves to be valid, the comparator 5 outputs two kinds of hit signals: a cache hit or miss signal and a WAY hit signal. The cache hit or miss signal is applied to the processor via the controller 3, while the WAY hit signal is sent to a write WAY selector 8 and a read WAY selector 10.

The cache memory has three kinds of operation modes: (1) a cache hit READ mode in which the data saved in the cache is read out to the processor in response to a cache hit; (2) a cache hit WRITE mode in which the data saved in the cache is updated or rewritten by the data applied from the processor upon a cache hit; and (3) a cache miss BLOCK WRITE mode which occurs in the event of a cache miss and in which a data element required by the processor is transferred from the main memory to the processor and substantially at the same time the four data blocks containing the data element in one block are saved in the cache in order to be available next time.

In the cache hit READ mode, the read WAY selector 10 selects one of the WAYs of the data storage section 9 in response to the WAY hit signal and the data required by the processor is specified by set and block addresses applied to the storage section 9. Thereafter, the data defined in the selected WAY is applied to the processor through the I/O data buffer 1. On the other hand, in the case of the cache hit WRITE mode, the write WAY selector 8 selects one of the WAYs of the data storage section 9 and the address of the data transferred from the processor is specified by set and block addresses applied to the storage section 9. Therefore, the data applied from the processor is written into the address in the selected WAY in order to update same.

In the cache miss BLOCK WRITE mode, the comparator 5 fails to ascertain a matched valid tag address and a cache miss is detected. When this happens, the comparator 5 applies a cache miss signal to the processor through the controller 3. In response to the cache miss signal, the processor accesses the main memory to derive therefrom a data element not found in the cache memory through an I/O data buffer/controller 13 and the I/O data buffer 1. On the other hand, a block load buffer 12 receives, from the buffer/controller 13, the four-block data in one of which the data element transferred to the processor is contained. The four-block data is sequentially, block by block, written into the WAY which has been selected by a block load WAY selector 11. It should be noted that the selector 11 is controlled by the output of the LRU WAY storage section 4.

As mentioned previously, each of the conventional cache memories in a multiprocessor system is provided with only one tag address comparator 5. Accordingly, when data in a given cache is rewritten, it is impossible to check whether or not the data with the same address of another cache has already been rewritten without access to the other cache. Therefore, there is a possibility that the non-updated content of the another cache is erroneously transferred to the processor assigned to the another cache. In order to avoid such a problem, the operations of the processors should be prevented until all the caches except for the actually updated cache are checked not to have incorrect data. This procedure causes a further reduction in system performance.

SUMMARY OF THE INVENTION

It is an object of this invention to provide a cache memory which is highly suited for use in a multiprocessor system.

Another object of this invention is to provide a cache memory which improves multiprocessing speed.

More specifically, the present invention takes the form of a multiprocessor system including a plurality of cache memories, wherein each cache memory is dedicated to a single processor and wherein a common main memory is shared by a plurality of processors, the cache memory comprises: first means for saving data for quick reference by the processor allocated to the cache memory; second means for saving tag addresses each corresponding to one data stored in the first means, the second means being configured to have dual ports so as to be indenpently accessible by the processor and another cache memory; third means for saving tag address valid information each of which indicates whether or not the corresponding tag address is valid, the third means being configured to have dual ports so as to be independently accessible by the processor and another cache memory; fourth means which, in the event of a cache update in another cache memory, supplies the second and third means with a set address of a main memory access signal outputted from the another cache memory in order to cause the second and third means to output the corresponding tag address and the corresponding tag address valid information, respectively; fifth means for comparing the tag address derived from the second means with a tag address of the main memory access signal and for checking to see if each tag address applied is valid, outputting a hit signal in the event that the tag addresses applied are identical and valid; and sixth means for invalidating the tag address valid information in response to the hit signal.

BRIEF DESCRIPTION OF THE DRAWINGS

The features and advantages of the present invention will become more clearly appreciated from the following description taken in conjunction with the accompanying drawings in which like blocks are denoted by like reference numerals and in which.

DETAILED DESCRIPTION OF THE PREFERRED EMBODIMENTS

A preferred embodiment of this invention will be discussed with reference to FIGS. 2 through 4.

Figure 1:
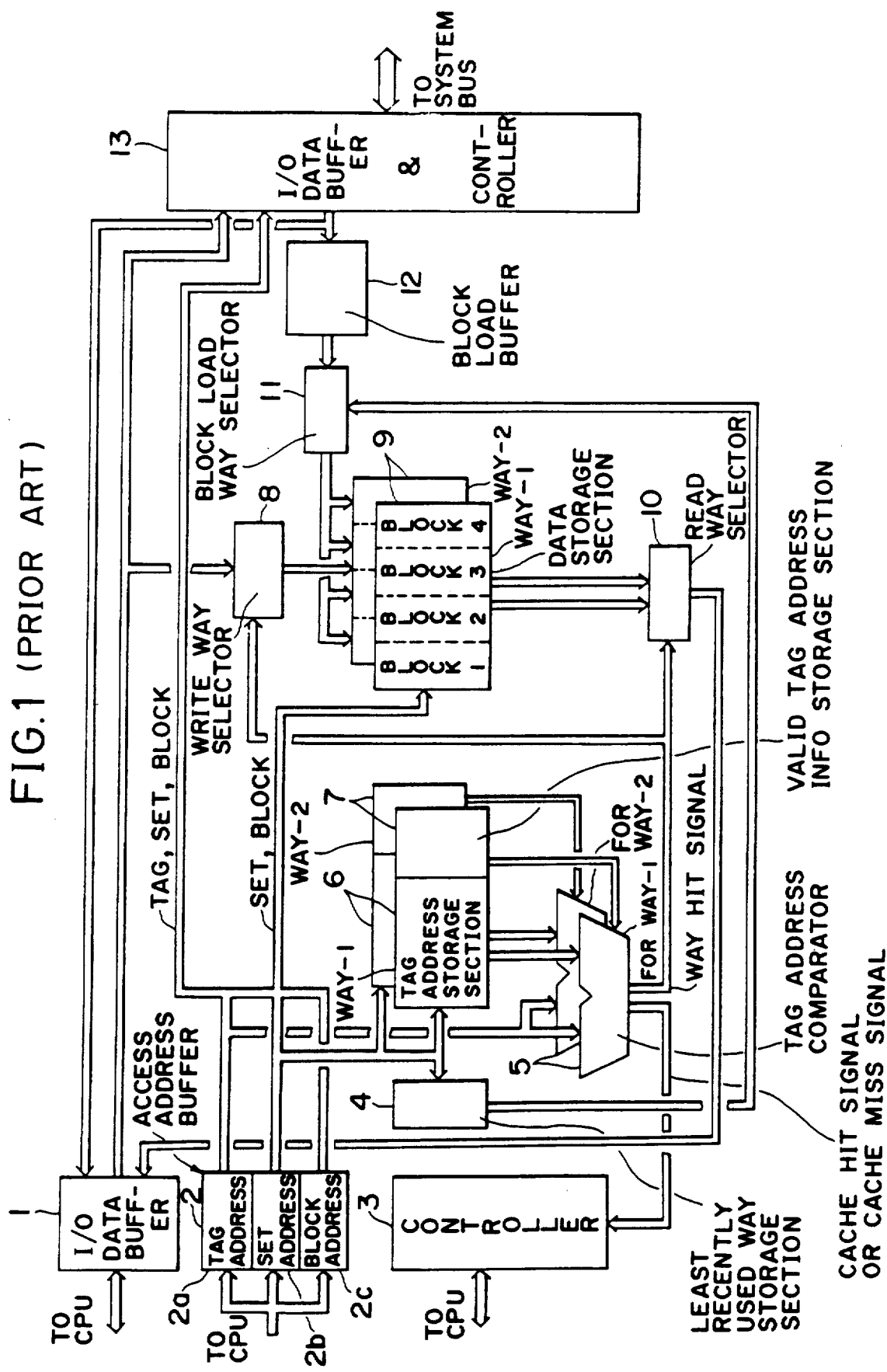
FIG. 1 is a block diagram showing the conventional cache memory referred to in the opening paragraphs of the instant disclosure.
Figure 2:
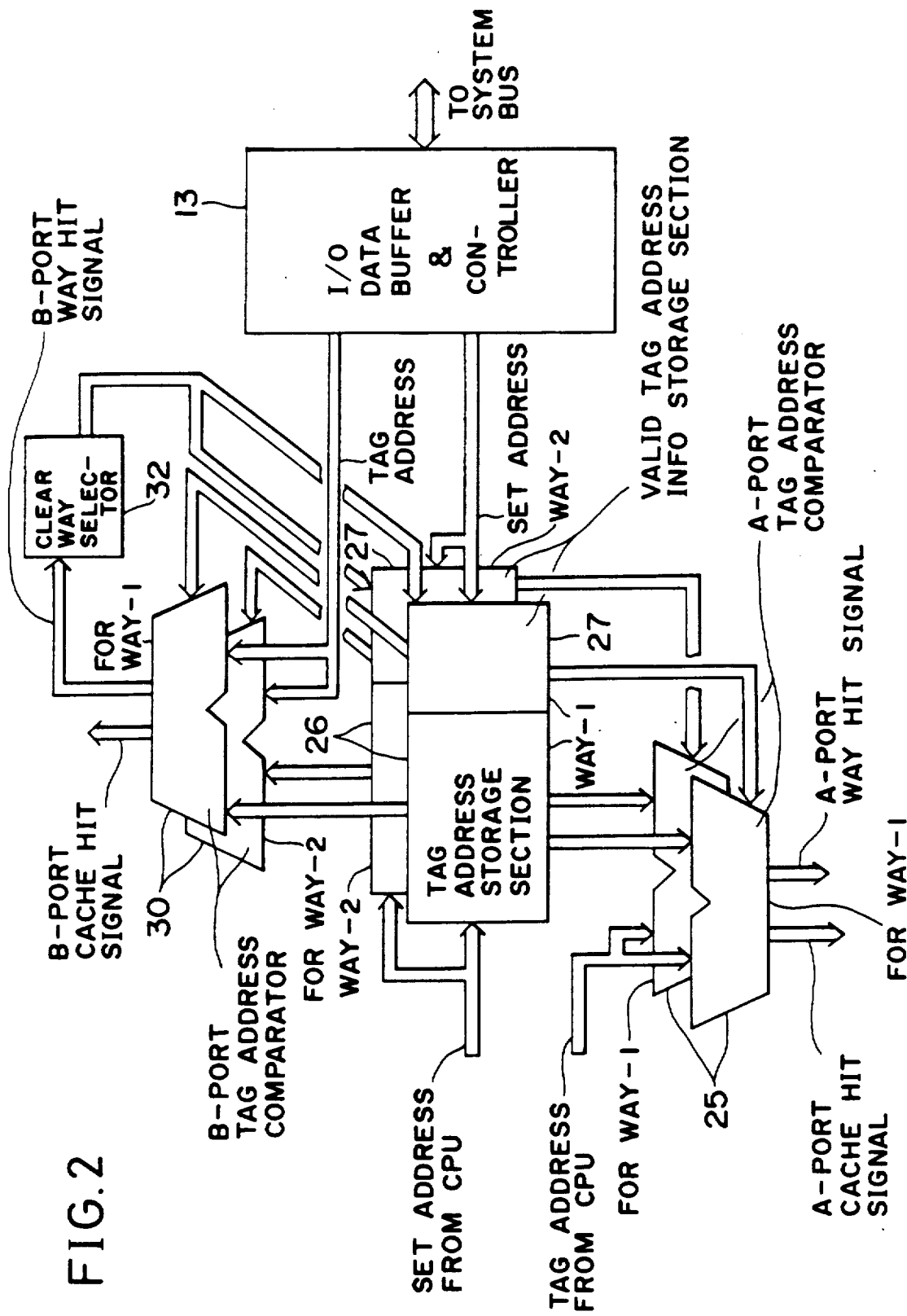
FIG. 2 is a block diagram showing a portion of a cache memory according to this invention.

FIG. 2 is a block diagram showing the arrangement which characterizes the preferred embodiment. The illustrated elements of the memory are the same as those shown in FIG. 1. A A-port tag address comparator 25 is identical to the comparator 5 of FIG. 1. A tag address storage section 26 and a valid tag address information storage section 27, are respectively identical to the sections 6 and 7 of FIG. 1 except that each of the sections 26, 27 is configured to have dual ports. In practice, each of the storage sections 26 and 27 is comprised of a plurality of memory cells. An example of each cell is illustrated in FIG. 4. As shown, memory cell is coupled to two word lines and also to two digit lines. This type of memory cell is well known in the art, so further descriptions thereof will be omitted for brevity. The most important feature of the dual-port storage sections 26, 27 is that they are independently accessible by the processor (CPU) allocated to the cache memory in question and by another cache memory via the circuit 13. The operations of the storage sections 26, 27 and the comparator 25, have already described in detail and will be omitted.

Figure 3:
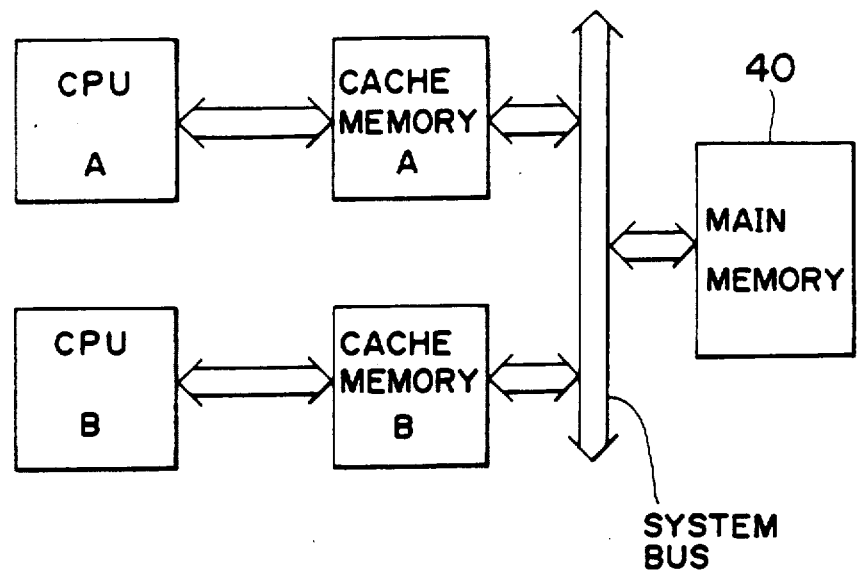
FIG. 3 is a simplified block diagram for explaining the operation of this invention, wherein a plurality of cache memories are arranged between a plurality of processors and a main memory.
Figure 4:
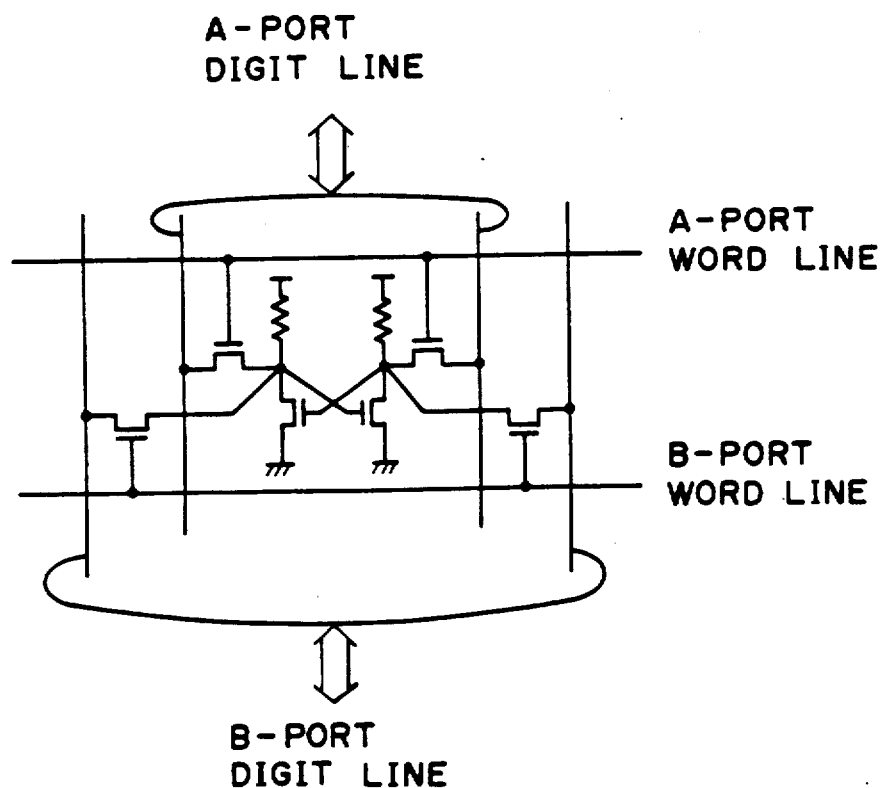
FIG. 4 is a block diagram showing a two-port memory cell which is applicable to the storage sections of a cache memory according to this invention.

Before further describing the FIG. 2 arrangement, reference is made to FIG. 3 which shows in a simplified manner two processors A, B, two cache memories A, B respectively dedicated to the processors A, B, and a main memory 40 which is shared by the processors A, B via a system bus. It is assumed that (a) the processor A outputs a update instruction to a given address and (b) in response to this update instruction the data at the address in the cache memory A and the main memory 40 are updated or rewritten. When this happens, the data at the same address of the cache B should also be rewritten. Otherwise, the processor B may read the previous data from the same address of the cache B, resulting in an erroneous system operation. The principle object of this invention is therefore to invalidate the data at the address to which an update has been performed in another cache memory and in a common main memory.

Referring back to FIG. 2, a B-port tag address comparator 30 and a clear WAY selector 32 are provided for the above-mentioned object of this invention. The circuit 13 is identical to the circuit depicted by the same numeral in FIG. 1. When the data at a certain address in another cache (referred to as CHASE A) and the common main memory has been rewritten in response to the update instruction from the processor assigned to CHASE A (this processor will be referred to as PROCESSOR A), the circuit 13 supplies the storage sections 26 and 27 with a set address involved in a main memory access signal used to update the main memory according to the update instruction of PROCESSOR A. In response to this set address, WAYs of the storage sections 26 and 27 respectively apply the corresponding tag address and the valid information to the corresponding WAYs of the comparator 30. The circuit 30 also applies a tag address, which is involved in the aforesaid main memory access signal, to each WAY of the comparator 30. Subsequently, the comparator 30 compares valid tag addresses applied. In the event that the comparator 30 detects a matched valid tag address, it outputs a B-port cache hit signal and a B-port WAY hit signal. The WAY hit signal is applied to the clear WAY selector 32 which selects one of the WAYs of the storage section 27. It is understood that the selected WAY involves the address whose data should be invalidated. Since the set signal specifies the address of each WAY, whose content has been compared, the address whose information should be cancelled is determined by the output of the selector 32.

On the other hand, if no matched valid tag address is not found at the comparator 30, no invalidating operation to the storage section 27 is unnecessary.

The foregoing description shows only a preferred embodiment of the present invention. The various modifications possible without departing from the scope of the present invention which is only limited by the appended claims will be apparent to those skilled in the art.

What is claimed is:

1. A multiprocessor system including a plurality of cache memories, wherein each cache memory is dedicated to a single processor and wherein a common main memory is shared by a plurality of processors via a system bus and wherein each cache memory includes a data storage section for saving data for quick reference by the processor allocated to the cache memory, the cache memory comprises:

first means for saving tag addresses each corresponding to one data stored in said data storage section, said first means being configured to have first and second ports so as to be independently accessible by the processor via said first port and by another cache memory via said second port;

second means for saving tag address valid information data each of which indicates whether or not the corresponding tag address is valid, said second means being configured to have third and fourth ports so as to be independently accessible by the processor via said third port and by another cache memory via said fourth port;

third means coupled to said first means via said first port and to said second means via said third port and to the processor, said third means comparing a tag address applied from said first means with a tag address from the processor and checking to see if the tag address applied from the processor is identical with the tag address from said first means and valid and outputting a first hit signal in the event that the tag address applied from the processor is identical with the tag address from said first means and valid;

fourth means arranged between said system bus and both of said first and second means, said fourth means being coupled to said first means via said second port and to said second means via said fourth port, said fourth means, in the event of a cache update in another cache memory, allowing said another cache memory to access said first and second means via said second and fourth ports, respectively;

fifth means coupled to said first means via said second port and to said second means via said fourth port and to said fourth means, said fifth means comparing a tag address applied from said first means with a tag address applied from said another cache memory via said fourth means in the event of a cache update in another cache memory, said fifth means checking to see if the tag address applied via said fourth means is identical with the tag address from said first means and valid and outputting a second hit signal in the event that the tag address applied via said fourth means is identical with the tag address from said first means and valid; and six means, arranged between said fifth means and said fourth port of said second means, invalidates the tag address valid information data within said second means in response to said second hit signal.

2. A multiprocessor system as claimed in claim 1, wherein the cache memory is fabricated on one chip.

* * * * *

UNITED STATES PATENT AND TRADEMARK OFFICE
CERTIFICATE OF CORRECTION

PATENT NO. : 5,056,002
DATED : October 8, 1991
INVENTOR(S) : Takayuki WATANABE

It is certified that error appears in the above-identified patent and that said Letters Patent is hereby corrected as shown below:

Col. 5, line 3, delete "CHASE" and insert --CACHE--;

Col. 5, line 6, delete "CHASE" and insert --CACHE--;

Col. 5, line 14, delete "circuit 30" and insert --circuit 13--;

Col. 5, line 31, delete "unnecessary" and insert --necessary--.

Signed and Sealed this

Ninth Day of March, 1993

Attest:

STEPHEN G. KUNIN

*Attesting Officer*   Acting Commissioner of Patents and Trademarks